(12) United States Patent
Hikata et al.

(10) Patent No.: US 11,220,432 B2
(45) Date of Patent: Jan. 11, 2022

(54) METHOD FOR PRODUCING CARBON NANOSTRUCTURE AND APPARATUS FOR PRODUCING CARBON NANOSTRUCTURE

(71) Applicant: SUMITOMO ELECTRIC INDUSTRIES, LTD., Osaka (JP)

(72) Inventors: Takeshi Hikata, Osaka (JP); Soichiro Okubo, Osaka (JP); Ryusuke Nakai, Osaka (JP); Daisuke Tanioka, Tokyo (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 419 days.

(21) Appl. No.: 16/308,141

(22) PCT Filed: Mar. 14, 2017

(86) PCT No.: PCT/JP2017/010230
§ 371 (c)(1),
(2) Date: Dec. 7, 2018

(87) PCT Pub. No.: WO2017/212729
PCT Pub. Date: Dec. 14, 2017

(65) Prior Publication Data
US 2019/0169030 A1    Jun. 6, 2019

(30) Foreign Application Priority Data

Jun. 10, 2016 (JP) .............................. JP2016-116718

(51) Int. Cl.
*C01B 32/15* (2017.01)
*C01B 32/162* (2017.01)
(Continued)

(52) U.S. Cl.
CPC .............. *C01B 32/15* (2017.08); *B01J 4/008* (2013.01); *B01J 15/005* (2013.01);
(Continued)

(58) Field of Classification Search
CPC ....... C01B 32/15; C01B 32/16; C01B 32/162; B82Y 40/00; B01J 15/005
See application file for complete search history.

(56) References Cited

U.S. PATENT DOCUMENTS

| | | | |
|---|---|---|---|
| 9,162,891 B2 * | 10/2015 | Hikata | ................... C01B 32/15 |
| 2005/0170089 A1 * | 8/2005 | Lashmore | .............. B82Y 40/00 |
| | | | 427/248.1 |

(Continued)

FOREIGN PATENT DOCUMENTS

| | | |
|---|---|---|
| JP | 2005-330175 A | 12/2005 |
| JP | 2013-237572 A | 11/2013 |
| WO | WO-2014132724 A1 * | 9/2014 ............. C23C 16/04 |

OTHER PUBLICATIONS

Takeshi Hikata et al., "Growth of bridging carbon nanofibers in cracks formed by heat-treating iron oxide thin sheets in acetylene gas," AIP Advances 3, 2013, pp. 042127-042127-12.

*Primary Examiner* — Richard M Rump
(74) *Attorney, Agent, or Firm* — Faegre Drinker Biddle & Reath LLP

(57) ABSTRACT

A method for producing a carbon nanostructure according to an aspect of the present invention is a method in which a carbon nanostructure is produced between a base body and a separable body while the separable body is relatively moved away from the base body, the base body including a carburizable metal that is a principal constituent, the separable body including a carburizable metal that is a principal constituent, the separable body being joined to or in contact with the base body in a linear or strip-like shape. The method includes a carburizing gas feed step, an oxidizing gas feed step, a heating step in which the portion of the base body at which the base body and the separable body are joined to or (Continued)

in contact with each other is heated, and a separation step in which the separable body is relatively moved away from the base body.

8 Claims, 3 Drawing Sheets

(51) Int. Cl.
*C01B 32/16* (2017.01)
*B01J 4/00* (2006.01)
*B01J 15/00* (2006.01)
*B01J 19/18* (2006.01)
*B82Y 40/00* (2011.01)

(52) U.S. Cl.
CPC ........... *B01J 19/1887* (2013.01); *C01B 32/16* (2017.08); *C01B 32/162* (2017.08); *B01J 2219/00033* (2013.01); *B82Y 40/00* (2013.01)

(56) References Cited

U.S. PATENT DOCUMENTS

2012/0301663 A1* 11/2012 Koike .................... B82Y 30/00
428/114
2016/0002041 A1* 1/2016 Hikata .................... C23C 16/46
428/367

* cited by examiner

METHOD FOR PRODUCING CARBON NANOSTRUCTURE AND APPARATUS FOR PRODUCING CARBON NANOSTRUCTURE

TECHNICAL FIELD

The present invention relates to a method for producing a carbon nanostructure and an apparatus for producing a carbon nanostructure.

The present application claims a priority to Japanese Patent Application No. 2016-116718 filed on Jun. 10, 2016, which is incorporated herein by reference in its entirety.

BACKGROUND ART

Carbon nanostructures constituted by carbon atoms arranged parallel to one another at nanometer intervals, such as linear carbon nanotubes and sheet-like graphene, are known. Carbon nanostructures are produced by, for example, feeding a raw-material gas containing carbon to fine catalyst particles composed of iron or the like while heating the catalyst particles in order to cause a carbon nanostructure to grow from the catalyst particles (see Japanese Unexamined Patent Application Publication No. 2005-330175).

There has also been proposed a method in which a catalyst is oxidized and the oxidized catalyst is divided into pieces while being carburized by heating in order to cause a carbon nanofilament to grow between the cut surfaces of the catalyst pieces (see Japanese Unexamined Patent Application Publication No. 2013-237572).

CITATION LIST

Patent Literature

PTL 1: Japanese Unexamined Patent Application Publication No. 2005-330175
PTL 2: Japanese Unexamined Patent Application Publication No. 2013-237572

SUMMARY OF INVENTION

A method for producing a carbon nanostructure according to an aspect of the present invention is a method in which a carbon nanostructure is produced between a base body and a separable body while the separable body is relatively moved away from the base body, the base body including a carburizable metal that is a principal constituent, the separable body including a carburizable metal that is a principal constituent, the separable body being joined to or in contact with the base body in a linear or strip-like shape. The method includes a carburizing gas feed step in which a carburizing gas is fed to at least a portion of the base body at which the base body and the separable body are joined to or in contact with each other; an oxidizing gas feed step in which an oxidizing gas is fed to at least a part of a portion of the base body which is other than the portion of the base body to which the carburizing gas is fed in the carburizing gas feed step; a heating step in which the portion of the base body at which the base body and the separable body are joined to or in contact with each other is heated; and a separation step in which the separable body is relatively moved away from the base body.

An apparatus for producing a carbon nanostructure according to another aspect of the present invention is an apparatus with which a carbon nanostructure is produced between a base body and a separable body while the separable body is relatively moved away from the base body, the base body including a carburizable metal that is a principal constituent, the separable body including a carburizable metal that is a principal constituent, the separable body being joined to or in contact with the base body in a linear or strip-like shape. The apparatus includes a separator that hermetically isolates a portion of the base body at which the base body and the separable body are joined to or in contact with each other from the other portion of the base body; a carburizing gas feed mechanism that feeds a carburizing gas to the portion of the base body at which the base body and the separable body are joined to or in contact with each other, the portion being isolated by the separator; an oxidizing gas feed mechanism that feeds an oxidizing gas to the other portion of the base body, the other portion being isolated by the separator; a heating mechanism that heats the portion of the base body at which the base body and the separable body are joined to or in contact with each other; and a separation mechanism that relatively moves the separable body away from the base body.

DESCRIPTION OF EMBODIMENTS

Figure 1:
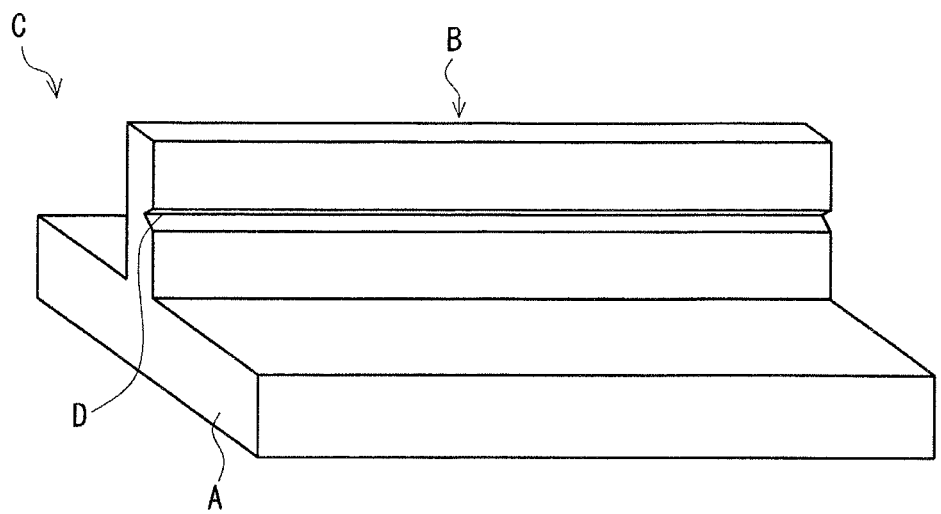
FIG. 1 is a schematic perspective view of a base body and a separable body that are used in the method for producing a carbon nanostructure according to an embodiment of the present invention.

Problems to be Solved by the Disclosure

In the case where the production method described in PTL 1 is used, it is difficult to control the direction in which carbon nanofilaments that constitute a carbon nanostructure grow from the catalyst particles and, consequently, the carbon nanofilaments are likely to bend. Bending of carbon nanofilaments may result in the formation of structural defects in the carbon nanofilaments, such as a five-membered ring or a seven-membered ring, which disadvantageously increase the resistance and the like of the carbon nanofilaments locally. Furthermore, it becomes difficult to bind a plurality of such carbon nanofilaments at a high density.

In the case where the method described in PTL 2, in which carbon nanofilaments are grown between the cut surfaces of the oxidized catalyst pieces, a tensile force generated in the carbon nanofilaments advantageously reduces the degree of bending of the carbon nanofilaments to a relatively small degree. However, in this method, the elongation of the carbon nanofilaments is limited (e.g., up to about 1 mm) and, consequently, the growth of the carbon nanofilaments stops with time. In addition, the dividing operation may result in rupture of the carbon nanofilaments.

Accordingly, in light of the above-described facts, it is an object to provide a method for producing a carbon nanostructure and an apparatus for producing a carbon nanostructure that enable a consistent growth of a carbon nanostructure.

Advantages of the Disclosure

According to the present disclosure, it is possible to grow a carbon nanostructure with consistency.

DESCRIPTION OF THE EMBODIMENTS OF THE INVENTION (1) A method for producing a carbon nanostructure according to an aspect of the present invention is a method in which a carbon nanostructure is produced between a base body and a separable body while the separable body is relatively moved away from the base body, the base body including a carburizable metal that is a principal constituent, the separable body including a carburizable metal that is a principal constituent, the separable body being joined to or in contact with the base body in a linear or strip-like shape. The method includes a carburizing gas feed step in which a carburizing gas is fed to at least a portion of the base body at which the base body and the separable body are joined to or in contact with each other; an oxidizing gas feed step in which an oxidizing gas is fed to at least a part of a portion of the base body which is other than the portion of the base body to which the carburizing gas is fed in the carburizing gas feed step; a heating step in which the portion of the base body at which the base body and the separable body are joined to or in contact with each other is heated; and a separation step in which the separable body is relatively moved away from the base body.

The inventors of the present invention conducted extensive studies and, as a result, found that continuous feeding of the carburizing gas performed in a method for producing a carbon nanostructure may result in excessive carburization of a catalyst metal. It was also found that the stop of growth of a carbon nanostructure is primarily caused by internal precipitation of carbon occurring as a result of the excessive carburization at protrusions formed in the vicinity of the gap between catalyst pieces, which serve as points of growth of the carbon nanostructure, the internal precipitation of carbon leading to loss of catalytic functions and decomposition of the protrusions. The inventors of the present invention conducted further studies on the basis of the above knowledge and, as a result, made the present invention.

The carburizing gas feed step, the heating step, and the separation step included in the method for producing a carbon nanostructure enable the base body to be fed with carbon, which is necessary for the growth of a carbon nanostructure (carburization), and a carbon nanostructure to grow in a gap formed between the base body and the separable body. Furthermore, since an oxidizing gas is fed to at least a portion of the base body in the oxidizing gas feed step included in the method for producing a carbon nanostructure, carbon contained in the base body can be removed adequately (decarburization). This reduces the precipitation of carbon at the protrusions of the base body, which serve as points of growth of the carbon nanostructure. Moreover, in the method for producing a carbon nanostructure, the portion of the base body fed with the oxidizing gas is isolated from the portion of the base body fed with the carburizing gas. This reduces the likelihood of a carbon nanostructure formed at the portion of the base body at which the base body and the separable body are joined to or in contact with each other becoming decomposed by the oxidizing gas. By the above mechanisms, the method for producing a carbon nanostructure is capable of consistently promoting the growth of a carbon nanostructure. The term "principal constituent" used herein refers to the constituent of highest content, such as a constituent included at a content of 50% by mass or more.

(2) It is advantageous that the carburizing gas include at least one selected from the group consisting of a hydrocarbon, carbon monoxide, and an alcohol. When the carburizing gas includes at least one selected from the group consisting of a hydrocarbon, carbon monoxide, and an alcohol, the base body can be carburized with certainty.

(3) It is advantageous that the oxidizing gas include at least one selected from the group consisting of oxygen, water vapor, and carbon dioxide. Gases that include an oxygen atom in the molecule, such as oxygen, water vapor, and carbon dioxide, can be suitably used as an oxidizing gas. Therefore, when the oxidizing gas includes at least one selected from the group consisting of oxygen, water vapor, and carbon dioxide, the base body can be decarburized with certainty.

(4) It is advantageous that the principal constituents of the base body and the separable body be selected from iron, nickel, cobalt, and an alloy of any of iron, nickel, and cobalt. When the principal constituents of the base body and the separable body are selected from iron, nickel, cobalt, and an alloy of any of iron, nickel, and cobalt, the base body and the separable body have, with certainty, a catalyst function necessary for growing a carbon nanostructure.

(5) It is advantageous that the base body and the separable body be joined to each other in a linear or strip-like shape, and that the separation performed in the separation step be to divide the separable body from the base body. When the base body and the separable body are joined to each other in a linear or strip-like shape and the separation performed in the separation step is to divide the separable body from the base body, the protrusions that serve as points of growth of a carbon nanostructure can be formed in the cut surface of the base body at which the separable body is divided from the base body. This increases the efficiency with which the carbon nanostructure is produced.

(6) It is advantageous that the portion of the base body at which the base body and the separable body are joined to each other have a notch formed therein, the notch inducing the division of the separable body from the base body. When the portion of the base body at which the base body and the separable body are joined to each other has a notch formed therein, the notch inducing the division of the separable body from the base body, the position at which the separable body is divided from the base body can be controlled with certainty.

(7) It is advantageous that the method for producing a carbon nanostructure further include a gap observation step in which a gap formed in the separation step is observed. In the method for producing a carbon nanostructure, a carbon nanostructure is selectively grown in the gap. Therefore, it is possible to readily monitor the growth of the carbon nanostructure with certainty by observing the gap. When the method for producing a carbon nanostructure further includes a gap observation step in which a gap formed in the separation step is observed, the balance between carburization and decarburization, the separating speed, and the like can be controlled on the basis of the degree of growth of the carbon nanostructure. This enables the production of a high-quality carbon nanostructure with further consistency.

(8) It is advantageous that the method for producing a carbon nanostructure further include an oxidizing-gas feed portion observation step in which the portion of the base body to which the oxidizing gas is fed in the oxidizing gas feed step is observed. When the method for producing a carbon nanostructure further includes an oxidizing-gas feed portion observation step in which the portion of the base body to which the oxidizing gas is fed in the oxidizing gas feed step is observed, the degree of precipitation of carbon in the base body can be monitored with certainty and the degree of decarburization or the like can be adjusted on the basis of the degree of precipitation. This enables the production of a high-quality carbon nanostructure with further consistency.

(9) An apparatus for producing a carbon nanostructure according to another aspect of the present invention is an apparatus with which a carbon nanostructure is produced between a base body and a separable body while the separable body is relatively moved away from the base body, the base body including a carburizable metal that is a principal constituent, the separable body including a carburizable metal that is a principal constituent, the separable body being joined to or in contact with the base body in a linear or strip-like shape. The apparatus includes a separator that hermetically isolates a portion of the base body at which the base body and the separable body are joined to or in contact with each other from the other portion of the base body; a carburizing gas feed mechanism that feeds a carburizing gas to the portion of the base body at which the base body and the separable body are joined to or in contact with each other, the portion being isolated by the separator; an oxidizing gas feed mechanism that feeds an oxidizing gas to the other portion of the base body, the other portion being isolated by the separator; a heating mechanism that heats the portion of the base body at which the base body and the separable body are joined to or in contact with each other; and a separation mechanism that relatively moves the separable body away from the base body.

The separator included in the apparatus for producing a carbon nanostructure, which hermetically isolates a portion of the base body at which the base body and the separable body are joined to or in contact with each other from the other portion of the base body, enables a carburizing gas to be fed to the points of growth of the carbon nanostructure and an oxidizing gas to be fed to the other portion of the base body. This enables the apparatus for producing a carbon nanostructure to adjust the carbon concentration in the base body to be adequate and to prevent the precipitation of carbon at the protrusions, which serve as points of growth of the carbon nanostructure. Consequently, the apparatus for producing a carbon nanostructure is capable of growing a carbon nanostructure with consistency.

(10) It is advantageous that the heating mechanism be a laser. When the heating mechanism is a laser, it is possible to selectively grow a carbon nanostructure in the gap with further certainty.

(11) It is advantageous that the apparatus further include a gap observation mechanism that observes a gap formed between the base body and the separable body. When the apparatus further includes a gap observation mechanism that observes a gap formed between the base body and the separable body, a high-quality carbon nanostructure can be produced with further consistency.

Details of the Embodiments of the Invention

Embodiments of the present invention are described below in detail with reference to the attached drawings.

In the method for producing a carbon nanostructure, a carbon nanostructure is produced by the following steps:

(1) a carburizing gas feed step in which a carburizing gas is fed to at least a portion of the base body at which the base body and the separable body are joined to or in contact with each other;

(2) an oxidizing gas feed step in which an oxidizing gas is fed to at least a part of a portion of the base body which is other than the portion of the base body to which the carburizing gas is fed in the carburizing gas feed step;

(3) a heating step in which the portion of the base body at which the base body and the separable body are joined to or in contact with each other is heated; and (4) a separation step in which the separable body is relatively moved away from the base body.

The method for producing a carbon nanostructure may further include (5) a gap observation step in which a gap formed in the separation step is observed and (6) an oxidizing-gas feed portion observation step in which the portion of the base body to which the oxidizing gas is fed in the oxidizing gas feed step is observed.

[Base Body and Joined Body]

In the method for producing a carbon nanostructure, a base body including a carburizable metal that is a principal constituent and a separable body including a carburizable metal that is a principal constituent, the separable body being joined to or in contact with the base body in a linear or strip-like shape, are used. The metals that are the principal constituents of the base body and the separable body are preferably metals capable of forming solid solution together with carbon and may be any other metal having a carburizable surface. The principal constituents of the base body and the separable body are preferably selected from iron, nickel, cobalt, and an alloy of any of iron, nickel, and cobalt and are more preferably iron from the aspect of cost. In such a case, the base body and the separable body may include an additive and the like which are other than the above metals and which do not impair the advantageous effects of the present disclosure. It is most preferable that the base body and the separable body be composed of pure iron having a purity of 4N or more.

The separable body may have any shape that allows the separable body to join to or come into contact with the base body and preferably has a strip-like (slender and tabular) shape. The average thickness of the separable body may be, for example, 10 µm or more and 1 mm or less.

In order to control the position at which the separable body is divided from the base body, which serves as a point of growth of a carbon nanostructure, it is preferable that the portion of the base body at which the base body and the separable body are joined to each other be not oxidized. If the above joint is oxidized, the carbon nanostructure that is to be produced may be destroyed. In addition, the joint may become brittle, which increases the likelihood of the separable body being divided from the base body at an unintended position. Increases in the volumes of the base body and the separable body due to the oxidation are preferably 15% or less, are more preferably 5% or less, and are further preferably 0% of the volumes of the base body and the separable body, respectively, that have not yet been oxidized.

FIG. 1 illustrates an example of the set of the base body and the separable body used in the present invention, that is, a joined body C constituted by a substantially tabular base body A and a strip-shaped separable body B joined to the surface of the base body A. Specifically, the base body A is constituted by a tabular portion having a rectangular shape when viewed in plan and a bump formed in one of the surfaces of the tabular portion so as to extend from one end to the other end of the tabular portion in the longitudinal direction (i.e., the horizontal direction in FIG. 1), the cross section of the bump being substantially rectangular. The separable body B is joined to a surface of the bump which is oriented in the direction in which the bump is protruded from the base body A, along the longitudinal direction.

As illustrated in FIG. 1, the joined body C has a notch D formed in the joint between the base body A and the separable portion B, the notch D inducing the division of the separable portion B from the base body A. The notch D is a groove-like notch formed in the thickness direction of the separable body B so as to extend along the longitudinal direction of the separable body B. The portion of the joint whose thickness has been reduced by the notch D is likely to rupture. That is, the separable body B is likely to be divided from the base body A along the notch D. This makes it easy to adjust the position at which the separable body B is divided from the base body, the position being the point of growth of a carbon nanostructure.

The average width of the notch D is not limited and may be, for example, 10 μm or more and 500 μm or less. The average depth of the notch D is not limited and may be, for example, 10% or more and 80% or less of the average thickness of the separable body B. The average depth of the notch D is the average of the maximum depths of the notch D measured at ten positions which are randomly selected in the longitudinal direction.

Figure 2:
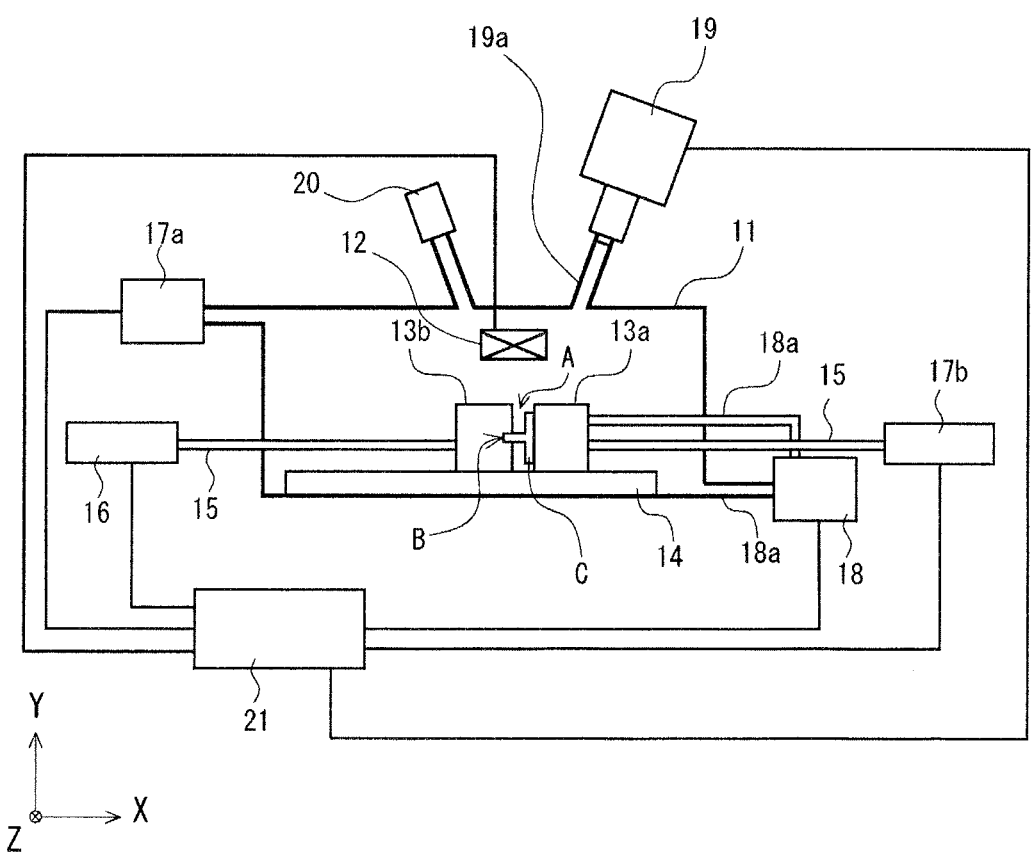
FIG. 2 is a schematic plan view of an apparatus for producing a carbon nanostructure according to another embodiment of the present invention.

A carbon nanostructure can be suitably produced using, for example, the apparatus for producing a carbon nanostructure according to an embodiment of the present invention which is illustrated in FIG. 2.

<Apparatus for Producing Carbon Nanostructure>

The apparatus for producing a carbon nanostructure which is illustrated in FIG. 2 includes a reaction chamber 11, which is a closed container, and the following components disposed inside the reaction chamber 11: a heater 12 arranged in the vicinity of the ceiling of the reaction chamber 11; a pair of holding units (i.e., a first holding unit 13a and a second holding unit 13b) arranged to face the heater 12, with which the joined body C is held; and a support 14 on which the pair of holding units are supported.

Figure 3:
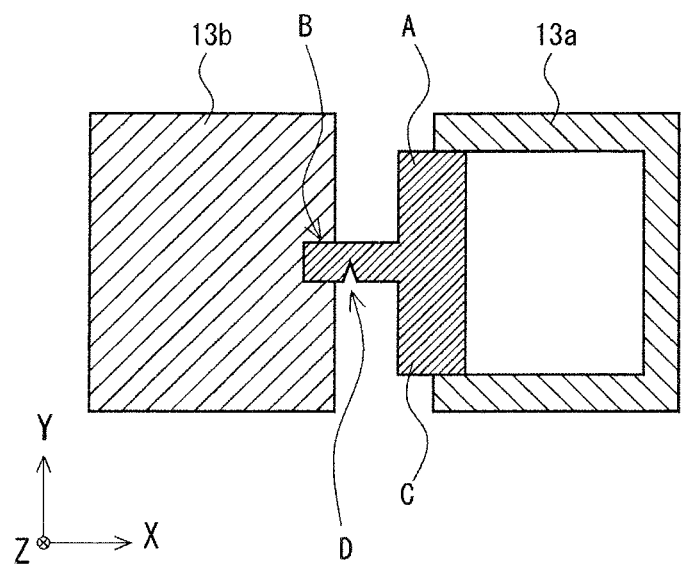
FIG. 3 is a schematic end view of a portion of the production apparatus illustrated in FIG. 2.

As illustrated in FIG. 3, the first holding unit 13a is a box-shaped member including a top plate, a bottom plate, and three side plates, one of the sides of the box-shaped member being open. Fitting the base body A into the open side holds the four sides of the base body A. Thus, the base body A is held by the first holding unit 13a such that the planar direction of the base body A is the same as the vertical direction (the Y-Z plane direction in the drawing). The second holding unit 13b holds a portion of the separable body B which is in the vicinity of an end of the separable body B which is other than the end at which the separable body B is joined to the base body A, along the longitudinal direction. Thus, the separable body B is held by the second holding unit 13b such that the longitudinal direction of the separable body B is the same as the Z-direction of FIG. 3. In addition to holding the base body A, the first holding unit 13a serves as a separator that hermetically isolates a portion of the base body A at which the base body A is joined to the separable body B (in FIG. 3, the left-side portion of the base body A) from the other portion of the base body A (in FIG. 3, the right-side portion of the base body A). The first holding unit 13a may optionally include an observation device (not illustrated), such as a Raman spectrometer, disposed inside the first holding unit 13a in order to monitor the degree of precipitation of carbon on the right-side surface of the joined body C The apparatus for producing a carbon nanostructure further includes the following components disposed outside the reaction chamber 11: a driving unit 16 connected to the second holding unit 13b with a connecting rod 15; a carburizing gas feed unit 17a with which a carburizing gas is fed to the reaction chamber 11; an oxidizing gas feed unit 17b with which an oxidizing gas is fed to the inside of the first holding unit 13a; an exhaust unit 18 connected to each of the reaction chamber 11 and the inside of the first holding unit 13a with exhaust pipes 18a to exhaust a gas from the reaction chamber 11 and the inside of the first holding unit 13a; a laser beam oscillator 19 with which the joint between the base body A and the separable body B is heated inside the reaction chamber 11; an observation unit 20 with which the gap between the base body A and the separable body B is observed; and a control unit 21 with which the heater 12, the driving unit 16, the carburizing gas feed unit 17a, the oxidizing gas feed unit 17b, the exhaust unit 18, and the laser beam oscillator 19 are controlled.

The carburizing gas feed unit 17a feeds a carburizing gas to the portion of the base body A at which the base body A is joined to the separable body B (in FIG. 3, the left-side portion of the base body A) and to the separable body B. The oxidizing gas feed unit 17b feeds an oxidizing gas to the other portion of the base body A which is hermetically isolated by the first holding unit 13a (in FIG. 3, the right-side portion of the base body A).

Figure 4:
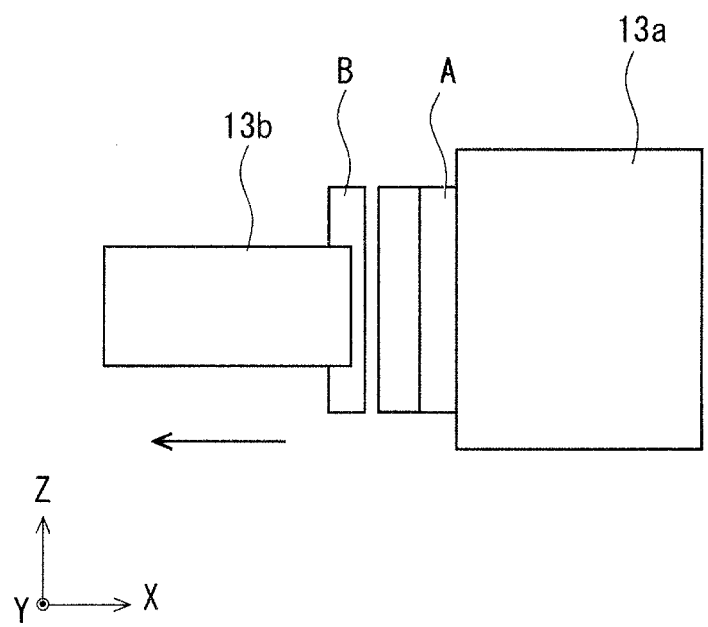
FIG. 4 is a schematic plan view of the production apparatus illustrated in FIG. 2, illustrating the state in which a separable body is moved away from a base body with the production apparatus which is viewed from above (i.e., in the Y-direction).

A pair of the first holding unit 13a and the second holding unit 13b are disposed on the upper surface of the support 14; the first holding unit 13a is fixed to the support 14, while the second holding unit 13b is disposed on the support 14 so as to be movable in the horizontal direction. That is, the first holding unit 13a and the second holding unit 13b are capable of relatively moving in the respective directions in which the members held by the holding units are gradually moved away (i.e., divided) from each other (in FIG. 2, in the X-direction). Thus, as illustrated in FIG. 4, the first holding unit 13a and the second holding unit 13b are capable of applying a tensile force to the base body A and the separable body B in the direction in which the separable body B is separated from the base body A at the joint. The tensile force causes the base body A and the separable body B to be divided from each other at the joint and then gradually moved away from each other.

The heater 12 is disposed above the joined body C inside the reaction chamber 11. In the case where walls of the reaction chamber 11 are made of a translucent material, such as quartz, the heater 12 may be disposed outside the reaction chamber 11. The heater 12 may be any heating device, such as an electric heater.

The driving unit 16 is connected to the second holding unit 13b, which holds an end of the separable body B, with the connecting rod 15 and moves the second holding unit 13b in the horizontal direction parallel to the shaft of the connecting rod 15 to divide and then separate the base body A and the separable body B from each other in the above-described manner.

The laser beam oscillator 19 is a heat source used for locally heating the joint between the base body A and the separable body B. That is, a laser is used as a heating device. Specifically, an opening is formed in the upper wall of the reaction chamber 11, and a tubular laser beam entry 19a is connected to the opening. A laser beam generated from the laser beam oscillator 19 is impinged onto the joint between the base body A and the separable body B inside the reaction chamber 11, through the laser beam entry 19a.

The laser beam impinged onto the joint is preferably infrared radiation. Specifically, a laser beam having a wavelength of 900 nm or more and 1,000 nm or less is preferable.

The observation unit 20 is a gap observation mechanism with which the gap formed between the base body A and the separable body B is observed. The observation unit 20 may be any mechanism with which the growth of a carbon nanostructure can be monitored. Examples of the observation unit 20 include an optical microscope and thermography.

The steps included in the method for producing a carbon nanostructure are described below in detail.

(1) Carburizing Gas Feed Step

In this step, a carburizing gas is fed to the separable body B and the portion of the base body A at which the base body A is joined to the separable body B (in FIG. 3, the left-side portion of the base body A), which is hermetically isolated by the first holding unit 13a, with the carburizing gas feed unit 17a. The carburizing gas is not fed to the other portion of the base body A (in FIG. 3, the right-side portion of the base body A), which is hermetically isolated by the first holding unit 13a. This promotes, with certainty, the decarburization performed in (2) the oxidizing gas feed step described below.

The carburizing gas includes at least one selected from the group consisting of a hydrocarbon, carbon monoxide, and an alcohol. Examples of the hydrocarbon include acetylene, methane, and carbon monoxide. Examples of the alcohol include ethanol and methanol. Specific examples of the carburizing gas include a mixed gas of acetylene with nitrogen or argon; and a methane gas. In the case where a mixed gas containing acetylene is used, it is preferable to reduce the acetylene concentration in the mixed gas in order to inhibit amorphous carbon from depositing on the surface of the carbon nanostructure. The lower limit for the acetylene concentration in a mixed gas containing acetylene is preferably set to 0.1% by volume and is more preferably set to 2% by volume. The upper limit for the acetylene concentration in a mixed gas containing acetylene is preferably set to 20% by volume and is more preferably set to 10% by volume. If the acetylene concentration is less than the lower limit, it may become impossible to produce a long carbon nanostructure with efficiency. On the other hand, if the acetylene concentration exceeds the upper limit, amorphous carbon may be deposited on the surface of the carbon nanostructure to excessively increase the diameter of the filaments.

(2) Oxidizing Gas Feed Step

In this step, an oxidizing gas is fed to the other portion of the base body A (in FIG. 3, the right-side portion of the base body A), that is, a portion of the base body A which is other than the portion to which the carburizing gas is fed in the carburizing gas feed step, with the oxidizing gas feed unit 17b. The oxidizing gas is not fed to the joint between the base body A and the separable body B or the separable body B. This reduces the likelihood of a carbon nanostructure grown at the joint between the base body A and the separable body B becoming decomposed by the oxidizing gas.

The oxidizing gas is a gas that contains an oxygen atom in the molecule. Specifically, the oxidizing gas is a gas containing at least one selected from the group consisting of oxygen, water vapor, and carbon dioxide. Specific examples of the oxidizing gas include a mixed gas of carbon dioxide with nitrogen or argon and a mixed gas of oxygen with nitrogen or argon. Among these oxidizing gases, a mixed gas of carbon dioxide with nitrogen or argon is preferable from the aspect of ease of handling. From the aspect of reaction responsivity, a mixed gas of oxygen with nitrogen or argon is preferable.

In the case where a gas containing carbon dioxide is used, the lower limit for the carbon dioxide concentration in the mixed gas is preferably set to 5% by volume and is more preferably set to 10% by volume, and the upper limit for the carbon dioxide concentration in the mixed gas is preferably set to 100% by volume and is more preferably set to 30% by volume. If the carbon dioxide concentration is less than the lower limit, the decarburization may fail to be achieved to a sufficient degree and, consequently, the precipitation of carbon at the growth point is induced. This may stop the growth of the carbon nanostructure. On the other hand, if the carbon dioxide concentration exceeds the upper limit, excessive decarburization occurs, which may inhibit the growth of the carbon nanostructure.

In the case where a mixed gas of oxygen with nitrogen or argon is used, the lower limit for the oxygen concentration in the mixed gas is preferably set to 0.0001% by volume and is more preferably set to 0.001% by volume and the upper limit for the oxygen concentration in the mixed gas is preferably set to 1% by volume and is more preferably set to 0.1% by volume. If the oxygen concentration is less than the lower limit, the decarburization may fail to be achieved to a sufficient degree and, consequently, the precipitation of carbon at the growth point is induced. This may stop the growth of the carbon nanostructure. On the other hand, if the oxygen concentration exceeds the upper limit, excessive decarburization occurs, which may inhibit the growth of the carbon nanostructure. In addition, such an oxidizing gas needs to be handled so as not to come into contact with the carburization gas, which is combustible. This may increase the management cost.

In this embodiment, the carburization performed in (1) the carburizing gas feed step and the decarburization performed in (2) the oxidizing gas feed step are used in combination to control the carbon concentrations in the base body A and the separable body B to fall within an adequate range. Specifically, the rate and the concentration at which the carburizing gas is fed are set to be sufficient for the growth of a carbon nanostructure. The rate and the concentration at which the oxidizing gas is fed are set such that decarburization of the base body A is induced to reduce the precipitation of carbon at the growth point and excessive decarburization, which may inhibit the growth of a carbon nanostructure, does not occur. A specific example of the controlling method is to change the rate and the concentration at which the carburizing gas is fed by the carburizing gas feed unit 17a and the rate and the concentration at which the oxidizing gas is fed by the oxidizing gas feed unit 17b with the control unit 21.

(3) Heating Step

In this step, a laser beam generated by the laser beam oscillator 19 is impinged onto the joint between the base body A and the separable body B in order to locally heat the joint. This promotes a selective growth of a carbon nanostructure at the joint.

The power of the laser heating is, for example, 1 W or more and 50 W or less. The amount of time during which the heating is performed may be, for example, 1 minute or more and 10 hours or less. If the amount of heating time exceeds 10 hours, excessive carburization may occur, which increases the likelihood of deformation of the metal. The temperature at which the heating is performed may be, for example, 800° C. or more and 1150° C. or less in terms of core temperature. Moreover, it is preferable to adjust the amount of irradiation of the laser in a nitrogen atmosphere such that the point of growth of a carbon nanostructure in the joint has a constant temperature.

It is preferable to conduct (1) the carburizing gas feed step and (2) the oxidizing gas feed step simultaneously with the heating of the joint after the laser irradiation has been started. In particular, (2) the oxidizing gas feed step is preferably started after the power of the laser has been stabilized subsequent to the start of the laser irradiation.

(4) Separation Step

In this step, the separable body B is relatively moved away from the base body A in order to form a carbon nanostructure therebetween. Specifically, the second holding unit 13b that holds the separable body B is gradually moved by the driving unit 16 in a horizontal direction so as to be separated from the first holding unit 13a, which holds a first holding portion G1 of the joined body C. Consequently, a tensile force that causes the separable body B to be divided from the base body A is applied to the joint between the base body A and the separable body B. As a result, the separable body B is divided from the base body A and then gradually moved away from the base body A, as illustrated in FIG. 4.

This step enables a carbon nanostructure to be selectively grown between the cut surfaces of the separable body B and the base body A at which the separable body B is divided from the base body A. Therefore, a carbon nanostructure can be produced with consistency. In this step, furthermore, a carbon nanostructure is grown from the above cut surfaces while a certain amount of tensile force is applied to the carbon nanostructure. This reduces the deformation of the carbon nanostructure, such as bending. In this step, moreover, it is not necessary to oxidize the base body A and the separable body B. This markedly reduces the production cost of a carbon nanostructure.

In this step, the cut surface of the separable body B is selectively irradiated with a laser. This inhibits a carbon nanostructure from growing at positions other than the cut surface and causes the carbon nanostructure to selectively grow at the cut surface with further certainty. The division of the separable body B from the base body A may be performed not only while the temperature of the separable body B is held constant but also while the temperature of the separable body B is increased or reduced.

In this step, feeding the carburizing gas to the gap enables carburization of the base body A and the separable body B, and feeding of the oxidizing gas prevents excessive carburization of the base body A, which may result in precipitation of carbon at the points of growth of a carbon nanostructure. Thus, simultaneous feeding of the carburizing gas and the oxidizing gas promotes a further consistent growth of a carbon nanostructure.

The separating speed at which the separable body B is moved away from the base body A (i.e., a change in the distance between the base body A and the separable body B per unit time) is adjusted in accordance with, for example, the size of the carbon nanostructure that is to be grown. The lower limit for the separating speed is preferably set to 0.01 mm/min and is more preferably set to 0.1 mm/min. The upper limit for the separating speed is preferably set to 20 mm/min and is more preferably set to 2.2 mm/min. If the separating speed is less than the lower limit, the efficiency with which a carbon nanostructure is produced may be reduced and the production cost may be increased accordingly. On the other hand, if the separating speed exceeds the upper limit, the carbon nanostructure may rupture during growth.

The above operations enable a continuous growth of a carbon nanostructure (i.e., carbon nanofilaments) between the cut surfaces of the base body A and the separable body B at which the separable body B is divided from the base body A. That is, in the present invention, the joint between the base body A and the separable body B is heated in (3) the heating step and, subsequently, the separable body B is divided and then moved away from the base body A in (4) the separation step, while the carbon concentrations in the base body A and the separable body B are adjusted in (1) the carburizing gas feed step and (2) the oxidizing gas feed step. Consequently, a carbon nanostructure (i.e., carbon nanofilaments) is grown so as to connect between the cut surfaces formed in (4) the separation step. Gradually moving the separable body B away from the base body A such that the distance between the cut surfaces of the separable body B and the base body A is gradually increased results in the growth of a carbon nanostructure (i.e., carbon nanofilaments). Note that, the adjustment of carbon concentrations in the base body A and the separable body B in (2) the oxidizing gas feed step may be performed prior to the start of (4) the separation step but is preferably performed subsequent to the start of (4) the separation step.

It is preferable to cool a portion of the separable body B which does not contribute to the growth of a carbon nanostructure (i.e., carbon nanofilaments) with a cooler (not illustrated). The above modifications may increase the efficiency with which a carbon nanostructure is produced.

Feeding an inert gas, such as a nitrogen gas, to the inside of the reaction chamber 11 as a carrier gas enables reaction gases (e.g., carbon monoxide, carbon dioxide, and water vapor) generated from the carburizing gas in the formation of a carbon nanostructure to be exhausted from the reaction chamber 11 while the likelihood of the reaction gases coming into contact with the carbon nanostructure is minimized.

Figure 5:
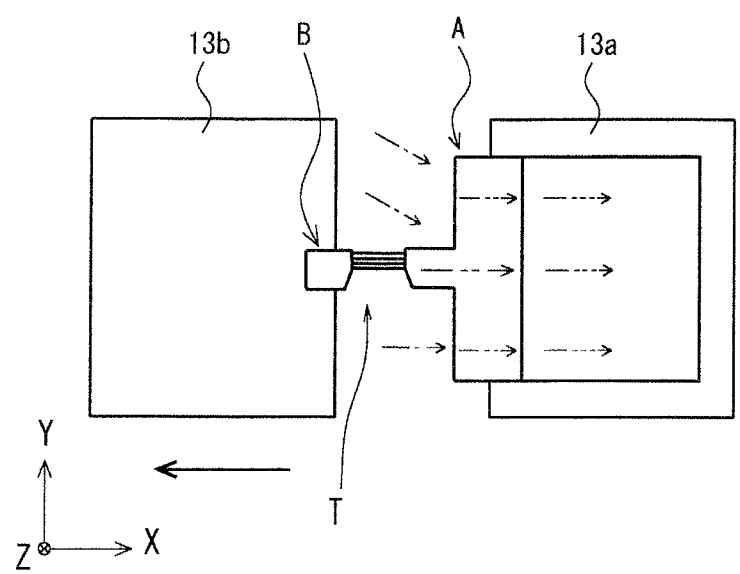
FIG. 5 is a schematic end view of the production apparatus illustrated in FIG. 2, illustrating the mechanism by which a carbon nanostructure (i.e., carbon nanofilaments) is grown when the production apparatus is used.

FIG. 5 illustrates the mechanisms by which a carbon nanostructure (i.e., carbon nanofilaments) T is grown between the cut surfaces of the separable body B and the base body A by the above four steps, that is, (1) the carburizing gas feed step to (4) the separation step, with the apparatus for producing a carbon nanostructure which is illustrated in FIG. 2. In FIG. 5, the portion of the base body A to which the separable body B was joined (in FIG. 5, the left-side portion of the base body A) is fed with a carburizing gas in (1) the carburizing gas feed step, while the other portion of the base body A (in FIG. 5, the right-side portion of the base body A) is fed with an oxidizing gas in (2) the oxidizing gas feed step. In the portion of the base body A to which the separable body B was joined, as a result of feeding of the carburizing gas, carbon atoms are added from the carburizing gas to the base body as denoted by the one-dot chain line (carburization). The carbon atoms added to the base body A diffuse into the base body A or along the surface of the base body A, and some of the carbon atoms reach the cut surface of the base body A at which the separable body B was divided from the base body A. Since the cut surface has been heated in (3) the heating step, the carbon atoms that reach the cut surface are formed into a carbon nanostructure (i.e., carbon nanofilaments) due to the catalytic action of the heated base body A, which is added to the base body-side end of the existing carbon nanostructure (i.e., the carbon nanofilaments) T. As a result, the carbon nanostructure (i.e., the carbon nanofilaments) T grows with an increase in the gap between the base body A and the separable body B which are moved away from each other in (4) the separation step.

On the other hand, among the carbon atoms added to the base body A, excess carbon atoms that have not been used as a raw material for the carbon nanostructure (i.e., the carbon nanofilaments) T diffuse into the base body and migrate from the portion of the base body A to which the separable body B was joined toward the other portion of the base body A as denoted by the two-dot chain line. The carbon atoms that reach the other portion come into contact with an oxidizing gas and are thereby released from the base body A into the oxidizing gas as denoted by the three-dot chain line (decarburization). In the above-described manner, the accumulation of excess carbon atoms at the base body A can be prevented, while the cut surface of the base body A at which the separable body B was divided from the base body A is fed with carbon atoms, which are a raw material for the carbon nanostructure (i.e., the carbon nanofilaments) T, with certainty. This enables a consistent growth of the carbon nanostructure (i.e., the carbon nanofilaments) T. Although not illustrated in FIG. 5, the carburization due to contact with a carburizing gas and the formation of the carbon nanostructure (i.e., the carbon nanofilaments) T using carbon atoms fed as a result of the carburization as a raw material also occur in the separable body B.

(5) Observation Step

In this step, the gap formed in the carbon nanostructure growth step is observed using the observation unit 20. Specifically, the process of growth of a carbon nanostructure (i.e., carbon nanofilaments) is monitored and various conditions such as dividing speed, heating temperature, and gas feed rate, are adjusted accordingly. This enables a further consistent production of a high-quality carbon nanostructure.

(6) Oxidizing-Gas Feed Portion Observation Step

In this step, the degree of precipitation of carbon in the base body A is monitored with a Raman spectrometer or the like (not illustrated) disposed, for example, inside of the first holding unit 13*a*. Specifically, the degree of precipitation of carbon is monitored and various conditions such as dividing speed, heating temperature, and gas feed rate, are adjusted accordingly. This enables a further consistent production of a high-quality carbon nanostructure.

The shape of a carbon nanostructure produced by the method for producing a carbon nanostructure is not limited; the carbon nanostructure may be, for example, linear, tubular, or film-like.

Other Embodiments

It is to be understood that the embodiments disclosed herein are illustrative and not restrictive in all aspects. It is intended that the scope of the present invention is not limited by the embodiments described above, is defined by the claims, and includes equivalents of the claims and all modifications within the scope of the claims.

In the method and apparatus for producing a carbon nanostructure, the separable body and the base body may be separated from each other by moving both separable body and base body away from each other. Alternatively, only the base body may be moved away from the separable body. The division of the separable body from the base body may be done by applying a shear force instead of a tensile force. In such a case, it is preferable to gradually tear the joint between the base body and the separable body in the direction from a longitudinal end of the joint to the other end. It is also possible to use a base body and a separable body that are not joined to each other but in contact with each other in a linear or strip-like shape, which can be separated from each other without division.

The oxidizing gas may be fed to, in addition to the base body, at least a part of a portion of the separable body which is other than the portion fed with the carburizing gas. Among the base body and the separable body, only the base body may be fed with the carburizing gas.

The heating of the portion of the base body to which the separable body is joined may be done using only a heater instead of using a laser. In other words, the laser beam oscillator is not an essential component of the apparatus for producing a carbon nanostructure. Although it is also possible to selectively grow a carbon nanostructure on the cut surface even when the entirety of the base body and the separable body is heated with a heater, it is preferable to heat only the cut surface in order to selectively grow a carbon nanostructure with further certainty. The means for heating the cut surface (i.e., the separated region) is not limited to a laser. In the case where the heating is done using a laser, the heater disposed inside the reaction chamber may be omitted.

In the case where, for example, the conditions under which a carbon nanostructure (i.e., carbon nanofilaments) grows are known, the portion of the base body from which the separable body is divided is not necessarily observed. Thus, in such a case, the observation unit of the apparatus for producing a carbon nanostructure may be omitted.

EXAMPLES

The present invention is described more specifically with reference to Examples below, which do not limit the present invention.

Test Example 1

A pure-iron substrate (purity: 4N) as illustrated in FIG. 1 was prepared. The substrate was constituted by a tabular member having a rectangular shape when viewed in plan (width: 10 mm, thickness: 0.05 mm, length: 10 mm), a bump formed in the surface of the tabular member so as to extend from one longitudinal end to the other end of the tabular member, the cross section of the bump being rectangular, and a notch formed in the bump along the longitudinal direction of the bump. The bump had a height of 10 mm and a length of 0.05 mm in the width direction. The average distance between the notch and the bump-side surface of the tabular member was 0.05 mm. The depth of the notch formed in the bump was 0.025 mm. The substrate was considered to be the joined body. A part of the bump above the notch was considered to be the separable body. The other part of the bump below the notch was considered to be the base body. The base body was attached to a separator that hermetically isolated the portion of the base body which was joined to the separable body from the other portion (i.e., the rear surface-side portion) of the base body, as illustrated in FIG. 3. Subsequently, while a nitrogen gas was fed to the portion of the base body which was joined to the separable body, the rear surface-side portion of the base body, and the separable body, a region that included the joint (i.e., the notch) between the base body and the separable body was heated with a laser beam having a wavelength of 940 nm (laser irradiation core temperature: about 900° C., irradiation time: 10 minutes). Then, a carburizing gas (5 vol % acetylene/95 vol % nitrogen) was fed to the portion of the base body which was joined to the separable body and the separable body, while the feeding of the nitrogen gas to the rear surface-side portion of the base body was continued.

While the power of the laser was controlled such that the heated portion had a constant temperature, when the power of the laser was stabilized, the base body and the separable body were pulled in a direction in which the two bodies are separated from each other in order to divide the two bodies from each other along the notch. The base body and the separable body were gradually moved away from each other at a speed of 0.2 mm/min. After the growth of a carbon nanofilament between the cut surfaces of the base body and the separable body which were formed as a result of the separation had been confirmed, the nitrogen gas fed to the rear surface-side portion of the base body was changed to an oxidizing gas (20 vol % carbon dioxide/80 vol % nitrogen). As a result, carbon nanofilaments having a length of 3 mm or more were grown between the cut surfaces of the base body and the separable body.

Test Example 2

The same substrate as that used in Test example 1 was prepared. An optical microscope was disposed above the front surface of the substrate in order to monitor the growth of carbon nanofilaments between the cut surfaces. A Raman spectrometer was disposed above the rear surface of the substrate in order to monitor the conditions of the surface of the base body. The base body was attached to a separator that hermetically isolated the portion of the base body which was joined to the separable body from the other portion (i.e., the rear surface-side portion) as illustrated in FIG. 3. Subsequently, while a nitrogen gas was fed to the portion of the base body which was joined to the separable body, the rear surface-side portion of the base body, and the separable body, a region that included the notch between the base body and the separable body was heated with a laser beam having a wavelength of 940 nm (laser irradiation core temperature: about 1000° C., irradiation time: 5 minutes). Then, a carburizing gas (methane) was fed to the portion of the base body which was joined to the separable body and the separable body, while the feeding of the nitrogen gas to the rear surface-side portion of the base body was continued. While the power of the laser was controlled such that the heated portion had a constant temperature, when the power of the laser was stabilized, the nitrogen gas fed to the rear surface-side portion of the base body was changed to an oxidizing gas (20 vol % carbon dioxide/80 vol % nitrogen). The base body and the separable body were pulled in a direction in which the two bodies are separated from each other in order to divide the two bodies from each other along the notch. The base body and the separable body were gradually moved away from each other at a speed of 0.2 mm/min. In this stage, while the growth of carbon nanofilaments on the front surface fed with the carburizing gas was monitored with the optical microscope, the proportions of iron oxide, iron, and carbon on the rear surface fed with the oxidizing gas were monitored with the Raman spectrometer in order to control the concentrations of the gases, the division speed, temperature, and the like such that the conditions under which the growth of carbon nanofilaments is best promoted are achieved. As a result, carbon nanofilaments having a length of 5 mm or more were grown between the cut surfaces of the base body and the separable body.

Comparative Example 1

The same substrate as that used in Test example 1 was prepared. The separator was not attached to the base body of the substrate so that only one gas was fed to the substrate. While a nitrogen gas was fed to the base body and the separable body, a region that included the notch between the base body and the separable body was heated with a laser beam having a wavelength of 940 nm (laser irradiation core temperature: about 900° C., irradiation time: 5 minutes). Then, a carburizing gas (methane) was fed to the base body and the separable body. While the power of the laser was controlled such that the heated portion had a constant temperature, when the power of the laser was stabilized, the base body and the separable body were pulled in a direction in which the two bodies are separated from each other in order to divide the two bodies from each other along the notch. The base body and the separable body were gradually moved away from each other at a speed of 0.2 mm/min. As a result, carbon nanofilaments having a length of 0.5 mm were grown between the cut surfaces of the base body and the separable body.

Comparative Example 2

The same substrate as that used in Test example 1 was prepared. The separator was not attached to the base body of the substrate so that only one gas is fed to the base body. While a mixed gas of a 95 vol % carburizing gas (5 vol % acetylene/95 vol % nitrogen) with a 5 vol % oxidizing gas (carbon dioxide) was fed to the base body and the separable body, a region that included the notch between the base body and the separable body was heated with a laser beam having a wavelength of 940 nm (laser irradiation core temperature: about 1000° C., irradiation time: 5 minutes). While the power of the laser was controlled such that the heated portion had a constant temperature, when the power of the laser was stabilized, the base body and the separable body were pulled in a direction in which the two bodies are separated from each other in order to divide the two bodies from each other along the notch. The base body and the separable body were gradually moved away from each other at a speed of 0.2 mm/min. However, it was not possible to grow carbon nanofilaments on the cut surfaces.

As is clear from the results obtained in Examples 1 and 2 and Comparative example 1, a carbon nanostructure (i.e., carbon nanofilaments) could be grown with further consistency by the method for producing a carbon nanostructure, in which the carburizing gas is fed to the base body while the oxidizing gas is fed to a portion of the base body which is other than the portion fed with the carburizing gas. As a result, a longer carbon nanostructure (i.e., carbon nanofilaments) could be produced. This is presumably because the carbon concentration in the base body can be adjusted to fall within the range optimum for a stable growth of a carbon nanostructure (i.e., carbon nanofilaments) by adequately decarburizing the base body with the oxidizing gas.

As is clear from the results obtained in Comparative example 2, it was not possible to produce a carbon nanostructure (i.e., carbon nanofilaments) when the oxidizing gas was fed to the portion of the base body at which the separable body was joined to the base body. This is presumably because the oxidizing gas decomposed a carbon nanostructure (i.e., carbon nanofilaments) that was to be grown at the above joint.

REFERENCE SIGNS LIST

11 REACTION CHAMBER
12 HEATER
13*a* FIRST HOLDING UNIT
13*b* SECOND HOLDING UNIT

14 SUPPORT
15 CONNECTING ROD
16 DRIVING UNIT
17a CARBURIZING GAS FEED UNIT
17b OXIDIZING GAS FEED UNIT
18 EXHAUST UNIT
18a EXHAUST PIPE
19 LASER BEAM OSCILLATOR
19a LASER BEAM ENTRY
20 OBSERVATION UNIT
21 CONTROL UNIT
A BASE BODY
B SEPARABLE BODY
C JOINED BODY
D NOTCH
T CARBON NANOSTRUCTURE (CARBON NANO-FILAMENTS)

The invention claimed is:

1. A method for producing a carbon nano structure in which a carbon nano structure is produced between a base body and a separable body while the separable body is relatively moved away from the base body, the base body including a carburizable metal that is a principal constituent, the separable body including a carburizable metal that is a principal constituent, the separable body being joined to or in contact with the base body in a linear or strip-like shape, the method comprising:
   a carburizing gas feed step in which a carburizing gas is fed to at least a portion of the base body at which the base body and the separable body are joined to or in contact with each other;
   an oxidizing gas feed step in which an oxidizing gas is fed to at least a part of a portion of the base body which is other than the portion of the base body to which the carburizing gas is fed in the carburizing gas feed step;
   a heating step in which the portion of the base body at which the base body and the separable body are joined to or in contact with each other is heated;
   a separation step in which the separable body is relatively moved away from the base body,
   wherein the oxidizing gas feed step overlaps the carburizing gas feed step in the separation step, and
   wherein a separator hermetically isolates the portion of the base body to which the carburizing gas is fed from the other portion of the base body to which the oxidizing gas is fed.

2. The method for producing a carbon nanostructure according to claim 1, wherein the carburizing gas includes at least one selected from the group consisting of a hydrocarbon, carbon monoxide, and an alcohol.

3. The method for producing a carbon nanostructure according to claim 1, wherein the oxidizing gas includes at least one selected from the group consisting of oxygen, water vapor, and carbon dioxide.

4. The method for producing a carbon nanostructure according to claim 1, wherein the principal constituents of the base body and the separable body are selected from iron, nickel, cobalt, and an alloy of any of iron, nickel, and cobalt.

5. The method for producing a carbon nanostructure according to claim 1, wherein the base body and the separable body are joined to each other in a linear or strip-like shape, and
   wherein the separation performed in the separation step is to divide the separable body from the base body.

6. The method for producing a carbon nanostructure according to claim 5, wherein the portion of the base body at which the base body and the separable body are joined to each other has a notch formed therein, the notch inducing division of the separable body from the base body.

7. The method for producing a carbon nanostructure according to claim 1, the method further comprising a gap observation step in which a gap formed in the separation step is observed.

8. The method for producing a carbon nanostructure according to claim 1, the method further comprising an oxidizing-gas feed portion observation step in which the portion of the base body to which the oxidizing gas is fed in the oxidizing gas feed step is observed.

* * * * *

UNITED STATES PATENT AND TRADEMARK OFFICE
CERTIFICATE OF CORRECTION

PATENT NO. : 11,220,432 B2
APPLICATION NO. : 16/308141
DATED : January 11, 2022
INVENTOR(S) : Takeshi Hikata et al.

It is certified that error appears in the above-identified patent and that said Letters Patent is hereby corrected as shown below:

In the Claims

At Column 17, Line 19, Claim 1, "nano structure" should read --nanostructure--.

Signed and Sealed this
Eighth Day of November, 2022

Katherine Kelly Vidal
*Director of the United States Patent and Trademark Office*